United States Patent
Fu et al.

(10) Patent No.: US 10,752,824 B2
(45) Date of Patent: Aug. 25, 2020

(54) HYDROLYTICALLY DEGRADABLE COMPOSITION

(71) Applicant: CDI Energy Products, Inc., Humble, TX (US)

(72) Inventors: Xuan Fu, Sugar Land, TX (US); Frederick Bligh Pippert, Sugar Land, TX (US)

(73) Assignee: CDI Energy Products, Inc., Humble, TX (US)

( * ) Notice: Subject to any disclaimer, the term of this patent is extended or adjusted under 35 U.S.C. 154(b) by 0 days.

(21) Appl. No.: 16/181,818

(22) Filed: Nov. 6, 2018

(65) Prior Publication Data

US 2019/0144735 A1    May 16, 2019

Related U.S. Application Data

(60) Provisional application No. 62/585,086, filed on Nov. 13, 2017.

(51) Int. Cl.

| | |
|---|---|
| *C09K 8/512* | (2006.01) |
| *C04B 26/16* | (2006.01) |
| *C04B 24/04* | (2006.01) |
| *C04B 24/28* | (2006.01) |
| *C09K 8/504* | (2006.01) |
| *C04B 103/00* | (2006.01) |

(52) U.S. Cl.
CPC .............. *C09K 8/512* (2013.01); *C04B 24/04* (2013.01); *C04B 24/28* (2013.01); *C04B 26/16* (2013.01); *C09K 8/5045* (2013.01); *C04B 2103/0062* (2013.01); *C04B 2103/0073* (2013.01); *C04B 2201/50* (2013.01); *C09K 2208/26* (2013.01)

(58) Field of Classification Search
None
See application file for complete search history.

(56) References Cited

U.S. PATENT DOCUMENTS

| | | | |
|---|---|---|---|
| 7,647,964 B2 | 1/2010 | Akbar et al. | |
| 9,528,343 B2 | 12/2016 | Jordan et al. | |
| 2012/0067581 A1* | 3/2012 | Auzerais | C04B 40/0633 |
| | | | 166/308.1 |
| 2012/0322924 A1* | 12/2012 | Arigo | C08K 9/06 |
| | | | 524/132 |
| 2016/0222752 A1* | 8/2016 | Fripp | E21B 33/12 |
| 2018/0118925 A1* | 5/2018 | Gozalo | C08K 3/30 |

OTHER PUBLICATIONS

T. Jablonowski; "Polyurethanes and Elastomers;" Vanderbilt Rubber Handbook; 14th edition (2010) (4 pages).
Brunauer et al., "Adsorption of Gases in Multimolecular Layers", J. American Chemical Society, vol. 60, Issue 2, dated Feb. 1938, pp. 309-319.
Standard Test Method for Silica, Precipitated, Hydrated—CTAB (Cetyltrimethylammonium Bromide) Surface Area, ASTM D6845-02 (2008), pp. 1-3.
Millathane 66 and Millathane 66M (Premilled), CAS# 27083-55-2, TSE Industries, Inc., May 30, 2017, 4 pages.
Millathane 76, CAS#: 37302-87-7, TSE Industries, Inc. May 26, 2015, 27 pages.

* cited by examiner

*Primary Examiner* — Robert T Butcher
(74) *Attorney, Agent, or Firm* — Shumaker, Loop & Kendrick, LLP

(57) ABSTRACT

Disclosed are time controlled, hydrolytically degradable compositions that include a polyurethane; precipitated silica, carbon black, or a combination thereof; an organic acid adapted to facilitate degradation when the composition is contacted with water; a stabilizer; a first crosslinking agent; and an optional co-agent. The composition is adapted to degrade over a predetermined time period upon contact with water at a pH ranging from 5 to 8 and at a temperature ranging from 100° F. to 250° F.

18 Claims, No Drawings

HYDROLYTICALLY DEGRADABLE COMPOSITION

TECHNICAL FIELD

The present invention relates generally to the field of devices and compositions for use in the oil field, and more particularly, to hydrolytically degradable compositions for downhole purposes that hydrolytically degrade in a time controlled manner thereby avoiding the need to introduce physical or chemical stimulus downhole to degrade these devices and compositions post-use.

BACKGROUND

Most compositions and devices currently used for downhole purposes are manufactured to be hydrolytically resistant—withstanding high temperature(s) and extreme pH environments for prolonged periods of time. Although these compositions can withstand extreme environments, these compositions and devices do not readily degrade and often require physical (e.g., milling) and/or chemical (e.g., strong inorganic acids or bases) stimulus to be introduced downhole to degrade and remove these compositions.

Although there are several degradable compositions currently known, these degradable compositions also face the same problems—requiring physical or chemical stimulus such as those discussed above in order to acceptably degrade and remove these compositions downhole post-use. For example, these degradable compositions are comprised of a metal-based alloy matrix and/or polyglycolic acid. For example, U.S. Pat. No. 7,647,964 discloses a polymeric ball sealer that degrades when contacted with, for example, acidified water, ammonium chloride, potassium chloride, etc. As another example, U.S. Pat. No. 9,528,343 discloses ball sealers formed of a dissolvable aluminum-based alloy matrix containing, for example, gallium with graphitic carbon particulate, and salt particulate, which dissolve in water upon mechanical agitation in the presence of gallium in a generally neutral pH. Even though several degradable compositions for downhole use are currently known, none of these compositions readily degrade downhole—with each requiring introduction of some form of physical and/or chemical stimulus to initiate and/or complete degradation of these compositions, which is time consuming, cumbersome, and costly.

SUMMARY

Therefore, a need exists to provide composition(s) and devices for downhole use(s) that overcome the above discussed problems. Disclosed are devices and compositions for use in the oil field that degrade in a time controlled manner and that do not require the additional introduction of physical (e.g., milling) and/or chemical stimulus (introduction of strong inorganic acids or bases) to facilitate composition/device degradation post-use of these compositions and devices. More particularly disclosed are hydrolytically degradable compositions for downhole purposes that hydrolytically degrade in a time controlled manner.

In one aspect, disclosed is a time controlled, hydrolytically degradable composition including a polyurethane as the base polymer (100 phr); precipitated silica, carbon black, or a combination thereof; an organic acid adapted to facilitate degradation when the composition is contacted with water; a stabilizer that improves aging stability; a co-agent or cure accelerator adapted to improve cure speed, crosslinking density and mechanical properties and at a concentration of 0.25 phr to 20 phr; and a crosslinking agent adapted to crosslink the double bonds of polyurethane at a concentration of 0.25 phr to 15 phr. The composition is adapted to degrade over a predetermined time period upon contact with water at a pH ranging from 5 to 8, more preferably from 6.5 to 7.5, and at a temperature ranging from 100° F. to 250° F., preferably 150° F. to 200° F. In certain aspects, the compositions disclosed herein can be used within frack plug assemblies, and more specifically, may be formed into seal(s) for use in frack plug(s)/frack plug assemblies. For example, these compositions can include hydrolytically degradable seals for use in frack plugs and/or for other downhole use purposes in a wellbore, these seals include polyurethane, silica, organic acid, stabilizer, and crosslinker(s) disclosed herein. The frack plug being configured to degrade in a time controlled manner over a predetermined time period upon contact with an aqueous solution (aqueous environment) at a temperature ranging from 100° F. to 250° F. In certain aspects, the predetermined time period is one of 3 days, 4 days, 5 days, or up to 30 days. In certain aspects, the predetermined time period ranged from 2 to 7 days and is more preferably from 3 to 5 days.

In certain aspects, the polyurethane is selected from a millable polyurethane, a castable polyurethane, a thermoplastic polyurethane, or combinations thereof.

In certain aspects, the polyurethane is a millable polyurethane. In certain preferred aspects, the millable polyurethane is a millable polyester polyurethane.

In certain aspects, the organic acid is selected from fatty acid, adipic acid, citric acid, acetic acid, or a combination thereof. In certain aspects, the organic acid is a fatty acid such as stearic acid, arachidic acid, palmitic acid, erucic acid, oleic acid, arachidonic acid, linoleic acid, linolenic acid, or combinations thereof.

In certain aspects, the organic acid is stearic acid.

In certain aspects, the stabilizer is an antioxidant. In certain aspects, the stabilizer is a polycarboiimide, and the polycarboiimide is included at an overall concentration ranging from 1 to 10 phr of the composition.

In certain aspects, the antioxidant is an aromatic amine antioxidant. In certain aspects, the aromatic amine antioxidant includes an aromatic polycarboiimide, and the aromatic polycarboiimide is included at an overall concentration ranging from 1 to 10 phr of the composition.

In certain aspects, the crosslinking agent is a peroxide or sulfur containing compound.

In certain aspects, the co-agent is acrylate, methacrylate, cyanurate, isocyanurate for peroxide cured systems. The accelerator is sulfenamide, thiazoles, guanidines, thiurams for sulfur cured systems.

In certain aspects, the composition is configured to lose from 35% to 50% tensile strength after contact with water for twenty four hours at a preferred temperature of 180° F. to 230° F.

In certain aspects, the composition has an initial tensile strength of 1000 to 5000 psi, elongation percentage of 100 to 1000%, and shore A durometer ranging from 60 to 95 before contact with water, and is configured to degrade having 0 to 500 psi tensile strength, 50 to 500% elongation percentage, and 20 to 60 Shore A durometer after three days of continuous contact with water at a temperature ranging from 150° F. to 250° F., preferably 150° F. to 200° F., and at a pH of ranging from 5 to 8, more preferably from 6.5 to 7.5.

In certain aspects, the composition includes an initial tensile strength of 1000 to 5000 psi, elongation percentage of 0 to 200%, and shore A durometer ranging from 60 to 95 before contact with water, and is configured to degrade having 0 to 200 psi tensile strength, 0 to 200% elongation percentage, and 10 to 40 Shore A durometer after five days of continuous contact with water at a temperature ranging from 150° F. to 250° F., preferably 150° F. to 200° F., and at a pH of ranging from 5 to 8, more preferably from 6.5 to 7.5.

As briefly disclosed above, in certain aspects the disclosed compositions may be included in hydrolytically degradable frack plug assemblies and/or frack plug seals included therein. For example, in certain aspects disclosed is a hydrolytically degradable frack plug seal adapted for downhole use in a wellbore, the frack plug seal including (a) a millable polyurethane; (b) precipitated silica, carbon black, or a combination thereof dispersed (preferably homogeneously dispersed) throughout the frack plug seal that is adapted to promote frack plug seal degradation when the frack plug seal is contacted with water and/or an aqueous environment; (c) an organic acid adapted to promote degradation of the frack plug seal when the frack plug seal is contacted with water and/or an aqueous environment; (d) a stabilizer that stabilizes the composition before contact with water and/or an aqueous environment; and (e) a crosslinking agent adapted that forms crosslinks throughout the millable polyurethane to provide hardness, rigidity, strength, and/or elasticity to the composition in which the frack plug seal is configured to degrade in a time controlled upon contact with water and/or an aqueous environment at a temperature. ranging from 100° F. to 250° F. In certain aspects, the precipitated silica, carbon black, or the combination thereof is homogeneously dispersed throughout the polyurethane of the hydrolytically degradable frack plug seal. Embodiments of the invention can include one or more or any combination of the above features and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

DETAILED DESCRIPTION

The present invention will now be described more fully hereinafter. It is to be understood that the aspects described below are not limited to specific compounds, synthetic methods, or uses as such may, of course, vary. It is also to be understood that the terminology used herein is for the purpose of describing particular aspects only and is not intended to be limiting. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention.

In this specification and in the claims that follow, reference will be made to a number of terms that shall be defined to have the following meanings:

It must be noted that, as used in the specification and the appended claims, the singular forms "a," "an" and "the" include plural referents unless the context clearly dictates otherwise.

"Optional" or "optionally" means that the subsequently described event or circumstance can or cannot occur, and that the description includes instances where the event or circumstance occurs and instances where it does not.

As used herein, the term "about" is used to provide flexibility to a numerical range endpoint by providing that a given value may be "slightly above" or "slightly below" the endpoint without affecting the desired result.

"Time Controlled" means that the composition degrades at a controlled rate, typically at an exponential or substantially exponential rate of decay, at a specific temperature, preferably when contacted with water (or an aqueous solution/aqueous environment) at a temperature between 150° F. to 250° F., preferably 150° F. to 200° F.

"Millable Polyurethane(s)" are polyurethanes produced by reacting polyol with isocyanate(s) and chain extenders with a final stoichiometric excess of hydroxyl groups, otherwise termed as "under indexed". "Index" is the ratio of the amount of isocyanate (NCO groups) to reactive hydroxyl (OH groups). See Polyurethanes and Elastomers by T. Jablonowski, Vanderbilt Rubber Handbook, $14^{th}$ edition (2010), which is incorporated herein by reference in its entirety.

"Millable Polyester Polyurethane(s)" are polyurethanes formed by reacting polyester polyols with isocyanate(s) and chain extenders as opposed to millable polyether polyurethane(s), which are formed by reacting polyether polyols with isocyanate(s) and chain extenders. Polyester polyols, include, but are not limited to condensation based products of adipic acid or other di-, tri-carboxylic acids, phthalic anhydride, trimethylolpropane or other glycols. Polyether polyols include, but are not limited to, polyethylene glycol, polypropylene glycol, polytetramethylene ether glycol. Millable polyester polyurethane(s) are more sensitive to hydrolytic degradation due to the level of unsaturation and reactivity with water resulting from the incorporation of the polyester polyol in the millable polyester polyurethane backbone when compared with millable polyether polyurethanes that are less reactive with water and have a higher degree of saturation.

"Castable Polyurethane(s)" are liquid pre-polymer systems that react polyol(s) with an excess of isocyanate and are subsequently mixed with chain extenders before being poured into a mold and cured. See Polyurethanes and Elastomers by T. Jablonowski, Vanderbilt Rubber Handbook, $14^{th}$ edition (2010) Castable polyurethanes typically cannot be melted and reformed after initial casting and curing.

"Thermoplastic Polyurethane(s)" is a polyurethane that can be melted and reformed as opposed to castable polyurethanes, which cannot be melted and reformed once cured. Thermoplastic polyurethanes are produced in one step with a slight excess of isocyanate (NCO groups) versus the combined OH number of polyol and chain extender. Thermoplastic polyurethane is melt processed by extrusion, injection molding, calendaring, and thermoforming. See Polyurethanes and Elastomers by T. Jablonowski, Vanderbilt Rubber Handbook, $14^{th}$ edition (2010).

"Silica" includes pyrogenic and precipitated siliceous fillers, although precipitated silicas are preferred. Precipitated silicas were obtained by the acidification of a soluble silicate, e.g., sodium silicate. The surface area of the precipitated silicas were determined by BET or CTAB methods, as described in the Journal of the American Chemical Society, Volume 60, page 304 (1930), and ASTM D6845-02 (2008), respectively. Various commercially available silicas may be used in the disclosed compositions. Exemplary silicas include Hi-Sil™ 532EP and 233 from PPG Industries, and Ultrasil® 7000 from Evonik. Surface treated silicas, such as Agilon® 400D from PPG Silica Products, may also be used.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within the ranges as if each numerical value and sub-range is explicitly recited. As an illustration, a numerical range of "about 1 to 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. as well as 1, 2, 3, 4, and 5, individually. The same principle applies to ranges reciting only one numerical value as a minimum or a maximum. Furthermore, such an interpretation should apply regardless of the breadth of the range or the characteristics being described.

The compositions and methods described herein can comprise, consist of, or consist essentially of the essential elements and limitations described herein, as well as any additional or optional ingredients, components, or limitations described herein.

Time Controlled, Hydrolytically Degradable Compositions

In one aspect, disclosed is a time controlled, hydrolytically degradable composition including a polyurethane as the base polymer; precipitated silica, carbon black, or a combination thereof; an organic acid adapted to facilitate degradation when the composition is contacted with water (and/or an aqueous environment); a stabilizer that improves aging stability; a co-agent or cure accelerator adapted to improve cure speed, crosslinking density and mechanical properties and at a concentration of 0.25 phr to 20 phr; and a crosslinking agent adapted to crosslink the double bonds of polyurethane at a concentration of 0.25 phr to 15 phr. The composition is adapted to degrade over a predetermined time period upon contact with water at a pH ranging from 5 to 8, more preferably at a pH ranging from 6.5 to 7.5, and at a temperature ranging from 100° F. to 250° F., preferably 150° F. to 200° F. In certain aspects, the compositions disclosed herein can be formed into frack plug seal(s) for use in a frack plug assembly. For example, these frack plug seals are hydrolytically degradable being, adapted for downhole use in a wellbore and include the polyurethane, silica (e.g, precipitated silica) and/or carbon black, organic acid, stabilizer, crosslinker(s), and/or other components disclosed herein. The frack plug seal being configured to degrade in a time controlled manner over a predetermined time period upon contact with aqueous solution at a temperature ranging from 100° F. to 250° F.

Polyurethane

Three major types of polyurethanes exist: castable, millable, and thermoplastic polyurethanes. Polyurethanes are formed by reacting polyol(s) with isocyanate(s) and chain extender(s). The basic reaction to produce polyurethane is

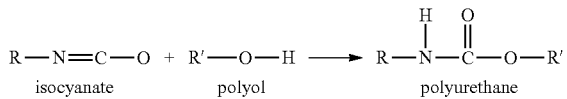

Both castable and thermoplastic polyurethanes have a segmented structure, where the polyurethane portions formed from diisocyanate represents the hard segments, while the polyurethane portions formed from polyether or the polyester polyols represent the soft segments. The elasticity comes from the segregation of the segments. Chain extenders are typically short-chain molecules used to increase the molecular weight and thus improve polyurethane strength.

Millable polyurethane (MPU) systems are formed by reacting isocyanates with polyether or polyester polyols and chain extenders and are further crosslinked and/or cured with a peroxide and/or sulfur donor system(s) to ensure sufficient strength and rigidity. Common trade names for millable polyurethanes include, but are not limited to, Millathane® (e.g., Millathane® 66, CAS #: 27083-55-2 or Millathane® 76, CAS #: 37302-87-7) produced by TSE Industries and Urepan® produced by Rhein Chemie. Millathane® 66 is only a peroxide curable polyurethane while Millathane® 76 is either peroxide or sulfur curable (i.e., capable of being cured with a peroxide or sulfur donor system(s)). Millable polyurethane systems are designed to be mixed and processed with conventional rubber processing equipment as opposed to the castabale liquid and thermoplastic urethane systems discussed above.

Although millable polyurethanes share much of the same chemistry as castable and thermoplastic polyurethanes, important differences exist between these polyurethanes. For example, millable polyurethanes typically have a higher degree of unsaturation (double bonds) in its polymer backbone, which allow for further crosslinking reactions with sulfur containing compounds or peroxides. In certain aspects, millable polyurethanes are produced by polymerizing unsaturated glycol(s) with diisocyanate in order to chain-extend the polymer to a desired molecular weight. Polyester linkages can be introduced by acids or anhydrides reacting with diols and further reacted with diisocyanates. Millable polyurethanes are gum-like solids and are able to accept various fillers therein.

As alluded to above and as discussed in further detail below, millable polyurethanes can be cured with peroxides or sulfur containing components and can be further compounded with various fillers and additives to resist various hydrocarbon-containing, chemical-containing, and/or aqueous environments. However, in contrast to the compositions disclosed herein, it should be noted that typical millable polyurethane systems are designed to be resistant to hydrolytic degradation at room temperature or higher temperatures (e.g., temperatures exceeding at least 200° F.) for several weeks to several months without significantly losing properties.

In contrast to conventional compositions formed from conventional millable polyurethane systems, the time controlled, hydrolytically degradable compositions disclosed herein utilize a millable polyurethane system that readily degrades in a high temperature, aqueous environment over a predetermined time period (e.g., 3 days, 4 days, 5 days, up to 30 days) at a controlled rate at various temperatures (e.g. 100° F. to 250° F.) and pH (e.g. 1-7). The preferred polyurethane for the time controlled, hydrolytically degradable compositions herein is a millable polyurethane, and more particularly, a millable polyester polyurethane. Millable polyester polyurethanes are preferred due to its susceptibility to hydrolytic degradation.

In certain aspects, the millable polyurethane and more particularly the millable polyester polyurethane is present at 20% to 90%, preferably at 30% to 80%, more preferably at 40% to 70%, and most preferably at 60% to 70% in the composition.

The above mentioned polyurethanes and compositions disclosed herein can be used to produce downhole tools commonly used in the oil and gas industry. For example, the millable polyurethane disclosed here preferably includes hardness from 70 Shore "A" to +80 Shore "D". This lower durometer is used to make the primary sealing elements of the frack plug from the disclosed compositions. In certain instances, this system is designed to allow the oil and gas development company to establish a series of frack plugs in a horizontal wellbore to allow for the multiple zones to be hydraulically fractured with a high-pressure sand-water mixture and after a certain period of time degrade to the point that the frack plug components/seals can be flushed from the wellbore with water. Since they do not require subsequent drilling or milling to remove all the components of the frack plug considerable expense can be eliminated.

Harder durometer systems, in some instances, can be used to make anti-extrusion components for the sealing system. The harder system can also be used in conjunction with fiber reinforcement to make rigid composites suitable for the structural components of the frack plug seal.

Silica

The disclosed compositions, in certain aspects, further include silica, which is dispersed (preferably homogeneously dispersed) throughout the millable polyurethane to enhance the mechanical properties of the time controlled, hydrolytically degradable compositions. While silica enhances mechanical properties, silica is also hygroscopic and further advantageously aids in degradation when the composition is in an aqueous environment.

Generally, two different types of silicas exist (precipitated silica and fumed silica) that may be included in the time controlled, hydrolytically degradable compositions. In further aspects, silica can be surface treated or virgin. For example, the silica may be surface treated with silanes to render the silica more hydrophilic or more hydrophobic. In this case, hydrophobic or hydrophilic silanes can be used to impact mixing and physical properties. For peroxide cured compounds, vinyl triethoxyl silanes are preferred as they can participate in the reaction. For sulfur cured compounds, sulfur containing silane, such as widely used Bis[3-(triethoxysilyl)propyl]tetrasulfide (TESPT), are a better choice. Silane can be added during the mixing. Another route is to use a pre-treated silica, such as Agilon® silica (PPG Industries Inc.), to improve silica to polymer interactions.

As alluded to above, including silica enhances/accelerates composition degradation by attracting water into the time controlled, hydrolytically degradable compositions when placed in aqueous environments. Use of precipitated silica is particularly preferred in the time controlled, hydrolytically degradable compositions because of its hydrophilicity and hygroscopic nature, and in certain aspects, the compositions include precipitated silica ranging from 10 phr to 120 phr, preferably 20-100 phr, more preferably 30-70 phr, and most preferably 30-60 phr to produce a shore A hardness from 30-90. The Brunauer-Emmett-Teller (BET) surface area of the precipitated silica ranges from 50-250 $m^2/g$, preferably 60-150 $m^2/g$, and most preferably 60-130 $m^2/g$. With sufficient silica dispersion (preferably homogeneous dispersion) throughout the time controlled, hydrolytically degradable composition, the polyester chain of the millable polyurethane will have water nearby due to the endogenous water content of silica even in the absence of a water source, which aids to accelerate degradation. High surface area silica (from 100 to 250 $m^2/g$, preferably from 100 to 150 $m^2/g$, and most preferably from 120 to 150 $m^2/g$) is preferred for better dispersion of water throughout the matrix. However, lower surface area silica (from 30 to 100 $m^2/g$, preferably from 50 to 100 $m^2/g$, and most preferably from 60 to 80 $m^2/g$), such as Hi-Sil™ 532 EP (PPG Industries Inc.; technical data sheet ©2011 incorporated by reference herein), can also be used alone or together to provide better processing properties by reducing the overall viscosity.

Precipitated silica can exist in different physical forms: milled, powder, or granular are the most common. The physical forms of the precipitated silica do not have significant impact to the properties of the compound, as long as it can be thoroughly (and homogeneously) dispersed in the matrix of the composition.

Peroxide Cure Agents

As alluded to above and when millable polyurethanes are used as the polyurethane in the time controlled, hydrolytically degradable composition, additional crosslinking agents are included to ensure sufficient composition strength and rigidity especially before the composition is contacted with water and/or an aqueous environment (i.e., before hydrolytic degradation).

In certain aspects, peroxides components may be used at an amount ranging from 1 to 10 phr as the crosslinking agent. Exemplary Peroxides include, for example, di(2,4-Dichloro benzoyl) peroxide, dicumyl peroxide, 2,5-dimethyl-2,5-Di(t-butylperoxy) hexane (e.g., Varox™ DBPH-50 by Vanderbilt Chemicals, LLC), T-butylperoxy-diisopropyl benzene, t-butylperoxy benzoate, butyl-4,4-di(t-butylperoxy) valerate. In certain preferred aspects, peroxides are included as the crosslinking agent at an amount ranging from 1 to 10 phr, more preferably at an amount ranging from 3 to 8 phr, and most preferably at an amount ranging from 4 to 6 phr.

In certain preferred aspects, a secondary co-agent is further included in the time controlled, hydrolytically degradable composition. Co-agents are commonly used in peroxide cure systems to improve degree of crosslinking and thus improve certain mechanical properties. Co-agents include, but not limited to, di-functional or tri-functional (methyl) acrylate esters, dimaleimides, zinc di (methyl) acrylates, zinc tri (methyl) acrylates, triallyl cyanurates, triallyl isocyanurates. In certain aspects, the second crosslinking agent is an isocyanurate containing compound present at an amount ranging from 1 to 20 phr, more preferably at an amount ranging from 1 to 10 phr, and most preferably at an amount ranging from 3 to 10 phr. In certain preferred aspects, the isocyanurate containing compound is triallyl isocyanurate (TAIC™ manufactured by Nippon Kasei Chemical Co., Ltd.) having following chemical formula:

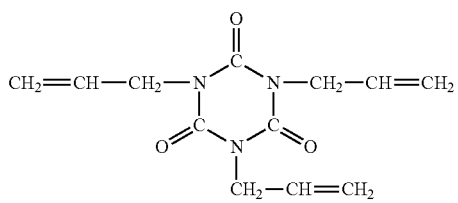 [SMILES: C=CCn1c(=O)n(CC=C)c(=O)n(CC=C)c1=O]

Surprisingly, triallyl isocyanurate has a significant influence on degradation behavior of the time controlled, hydrolytically degradable composition. Specifically, triallyl isocyanurate (also referred to herein as "TAIC"; CAS #: 1025-15-6) increases crosslinking density that impacts many mechanical properties such as hardness, tensile, elongation, modulus, and compression set. When triallyl isocyanurate falls below an amount of 5 phr in the time controlled, hydrolytically degradable composition, a very fine residue of degraded materials occurs after reaching the end of the process. When triallyl isocyanurate exceeds an amount of 5 phr in the time controlled, hydrolytically degradable composition, the completely degraded material has more, larger pieces of residue left, and the loss of tensile takes longer time to occur (than compositions including this chemical component within the above discussed range). Triallyl isocyanurate concentration may be further adjusted within these endpoints to optimize the time controlled degradation disclosed herein. For example, adding additional 5 phr of the co-agent will lengthen the degradation time and makes it more resistant to higher water temperature, as well as resisting higher hold pressure. The opposite effect can be achieved when it is reduced, with a sacrifice of overall hardness and modulus of the compound.

Sulfur Cure Agents

In certain aspects, sulfur components that include sulfur groups, reactive sulfur groups, thiol groups, and/or sulfur/sulfur donor moieties may be included as the crosslinking agent, and in this aspect, these particular crosslinking agents are included within the composition at an amount ranging from 0.1 to 10 phr.

In certain aspects, cure accelerators are included ranging from 0.1-10 phr. Exemplary chemicals are: guanidines, sulfenamides, thiazoles, thioureas, thiurams, dithiocarbamates, thiophosphates, xanthates. For example, in certain instances the sulfur cure agents used herein may include, for example, any combination of Dichloro[2,2'-dithiobis[benzothiazole]]zinc complex (e.g., Thanecure® ZM manufactured by TSE Industries including 50% Dichloro[2,2'-dithiobis[benzothiazole]]zinc complex (CAS #: 22405-83-0) and hydrated amorphous silica (CAS #: 112926-00-08)) ranging from 10 to 70 phr, 2-2'-Dithiobis(benzothiazole) (CAS #: 120-78-5) ranging from 0 to 10 phr (and in some instance from 0.5 to 8 phr, or more particularly 0.5 to 3.0 phr), elemental sulfur treated with magnesium carbonate (CAS #: 7704-34-9) ranging from 0 to 10 phr (and in some instance from 0.5 to 8 phr, or more particularly 0.5 to 3.0 phr), and/or 3-methyl-2-butene-1-thiol (or mercaptobenzothiazole) (CAS #: 149-30-4) ranging from 0 to 10 phr. In certain aspects, compositions disclosed herein that include sulfur cure agents/systems will exhibit higher tensile strength, elongation (%), and tear properties when compared with compositions cured with the disclosed peroxide curing systems. However, in certain aspects and when using peroxide curing systems when forming the disclosed compositions results in numerous advantages including lower compression set and aging resistance. Thus, the disclosed compositions can be modified accordingly depending on the particular properties desired and the curing agents/systems utilized in the disclosed compositions.

Organic Acid

To further control the degradation rate of the disclosed compositions and devices (e.g., sealing and structural components), the millable polyurethane is further compounded with at least one organic acid (i.e., an acid having a carboxylic acid moiety (—COOH). Exemplary organic acids for use in the disclosed time controlled, hydrolytically degradable composition include, for example, adipic acid, oleic acid, stearic acid, citric acid, or any di-functional, tri-functional carboxylic acids, or combinations thereof at 0.1 to 20 phr, preferably at 0.2 to 10 phr, more preferably at 0.5 to 5 phr, and most preferably at 0.5 to 2 phr in the composition.

One exemplary organic acid is stearic acid that is widely used in the industry. Stearic acid is included in the time controlled, hydrolytically degradable compositions at 0.1 to 20 phr, preferably at 0.2 to 10 phr, more preferably at 0.5 to 5 phr, and most preferably at 0.5 to 2 phr in the composition to improve the acidity enhanced hydrolysis. Although stearic acid is frequently used in conventional millable polyurethanes, the amount of stearic acid present in the time controlled, hydrolytically degradable compositions can be considerably higher than the amount present in conventional millable polyurethanes, which advantageously improves the overall degradation of the composition when contacted with water. By increasing the amount of organic acid, and more particularly stearic acid, in the time controlled, hydrolytically degradable compositions, reversible hydrolytic reactions are accelerated at higher temperatures, thus facilitating the time controlled hydrolytic degradation of the disclosed compositions in aqueous environments.

Stabilizing Agents

To control the rate of degradation, stabilizing agents are included in the time controlled, hydrolytically degradable compositions. For example, acid scavengers, which act as stabilizing agents, are included in the time controlled, hydrolytically degradable compositions to react with and control acidity (pH) in time controlled, hydrolytically degradable compositions. Carbodiimide containing components are preferred acid scavengers, which react with acids and act to neutralize pH.

For example, Dicyclohexylcarbodiimide and/or N,N'-Diisopropylcarbodiimide and/or derivatives thereof are suitable acid scavengers that may be included in the time controlled, hydrolytically degradable compositions. An exemplary stabilizing agent that may be used in the disclosed compositions is a polycarboiimide and/or an aromatic polycarboiimide (such as Millstab™ by TSE Industries, Inc.), which acts as an antihydrolysis agent. In certain aspects, the stabilizing agent is present at 0.5 to 10 phr, preferably at 1 to 8 phr, more preferably at 1 to 5 phr, and most preferably at 1 to 3 phr in the composition.

In certain aspects and to provide further stability and increase shelf life of the composition, a second stabilizing agent may be included. For example, the second stabilizing agent may include an antioxidant. The second stabilizing agent is present at 0.5 to 10 phr, preferably at 1 to 8 phr, more preferably at 1 to 5 phr, and most preferably at 1 to 2 phr in the composition and serves to elongate the shelflike of the compound and the parts. In preferred aspects, the second stabilizing agent is an aromatic amine antioxidant, which includes 4,4'-Bis(α,α-dimethylbenzyl) diphenylamine (e.g., Naugard® 445 by Addivant; CAS #: 10081-67-1) as shown below.

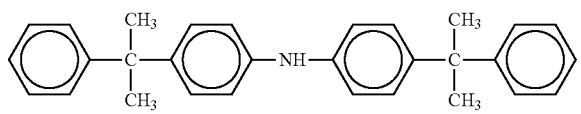

Additives

Other additives, may be included in the time controlled, hydrolytically degradable compositions to further modify the compositions for specifically desired environments; additives may be present in concentrations ranging from 0 to 25 phr, from 3 to 22 phr, or from 5 to 20 phr. For example, powders or fibrous materials such as polyvinyl acid (PVOH), tradename Poval, Solvron, or poly lactic acid (PLA), or poly glycolic sebacate (PGS), or poly glycolic acid (PGA), or a copolymer of isobutylene and maleic anhydride tradename Isobam are soluble at various temperatures in aqueous environments and can be included in the compositions to accelerate degradation rate in hot, aqueous environments.

Additional hygroscopic polymers such as super absorbent polymers (SAP) such as sodium polyacrylate, polyacrylamide, or polymethylacrylate can be included in the compositions to further absorb water and accelerate the degradation.

To accelerate degradation, weak to strong acids can be incorporated to catalyze the reverse reaction of esterification of the polymer. A convenient way is to increase the stearic acid, which is typically included in the majority recipes. The use range is from 0.1 to 10 phr, 0.2 to 5 phr, and more preferably 1-3 phr. Any short-chain or long-chain fatty acid derivatives, such as oleic acids, linoleic acids, are suitable for this purpose. Other carboxylic acids, dicarboxylic, or polycarboxylic acids are also preferred.

In certain examples and in lieu of and/or in addition to the inclusion of silica (e.g., precipitated silica disclosed herein), in the time controlled, hydrolytically degradable compositions, the time controlled hydrolytically degradable compositions may include carbon black. Carbon black typically reinforces the composition and is included if longer desirable degradation time is preferred. Carbon black is naturally hydrophobic, which will cause less swelling of the material and thus degrades slower in general. It could become an advantage when the water has higher temperature than 200° F., or the fracking takes longer than normal. When included in the disclosed compositions, carbon black is included at concentrations ranging from 0.5 to 100 phr, more preferably from 10 to 70 phr, and most preferably 20 to 60 phr. When included in the disclosed compositions, carbon black(s) may have different particle size and structure, which further allows the compounder to affect physical properties of the compositions as desired. However, any carbon black would have essentially the same degradability effect on the disclosed compositions.

WORKING EXAMPLES

The following examples are put forth so as to provide those of ordinary skill in the art with a complete disclosure and description of how the compounds, compositions, and methods described and claimed herein are made and evaluated, and are intended to be purely exemplary and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric.

Preparation of Samples

The compounds/compositions shown below in Tables 1, 3, and 5 were mixed in a Brabender internal mixer. Temperature in the chamber was set at 50° C., and the drop temperature was 130° C. The polymer (i.e., millable polyurethane—Millithane® 66 (CAS #: 27083-55-2) or Millithane®76 (CAS #: 37302-87-7), each by TSE Industries with the MSDS sheets dated May 30, 2017 and May 26, 2015 included by reference herein) was masticated for approximately 1 minute before adding half of the fillers (e.g., Hi-Sil 233 and/or N234 and/or N550). Afterwards, stabilizers, activators, processing aids, co-agents (e.g., polycarbodiimide, organic acid(s), TAIC 72%) were added in, followed by the second half of the fillers. The polymer was immediately cooled down on a cold mill (several passes in certain aspects) after being dropped to further mix and disperse ingredients therein. Once cooled and rested, the compound was remilled and curatives were added in and the drop temperature was 100° C. or less. The compound was rolled into a cylinder on the mill. The cylinder was turned 90° and fed back through the mill nip. The cylinder was put through the mill 5 times to complete the mixing.

Non-Carbon Black, Peroxide Cured Recipe:

The samples shown in Table 1 below were prepared according to the protocol discussed immediately above in the section entitled "Preparation of Samples". Samples B is identical with Sample A but includes 1.5 phr polycarbodiimides. Sample C is identical to Sample A but further includes 3.0 phr of polycarbodiimides. Overall concentrations of each component in Samples A-C are shown below in Table 1.

TABLE 1

| Ingredients | A | B | C |
|---|---|---|---|
| Millathane 66 | 100.00 | 100.00 | 100.00 |
| Polycarbodiimide | 0.0 | 1.50 | 3.00 |
| Hi-sil 233 | 40.00 | 40.00 | 40.00 |
| Stearic acid | 0.50 | 0.50 | 0.50 |
| Naugard 445 | 1.00 | 1.00 | 1.00 |
| TAIC 72% | 3.00 | 3.00 | 3.00 |
| DBPH-50 | 4.00 | 4.00 | 4.00 |
| total | 148.50 | 150.00 | 151.50 |

Degradation of Non-Carbon Black, Peroxide Cured Recipe Over Seven Days:

TABLE 2

| | A | B | C |
|---|---|---|---|
| PHYSICAL PROPERTIES | | | |
| TENSILE, psi | 2806 | 3277 | 3183 |
| ELONGATION, % | 421 | 478 | 531 |
| DUROMETER, SHORE A | 78 | 76 | 80 |
| M50, psi | 339 | 301 | 288 |
| M100, psi | 479 | 425 | 396 |

TABLE 2-continued

|  | A | B | C |
|---|---|---|---|
| Degraded @ 200 F. for 1 day | | | |
| TENSILE, Mpa/psi | 1657 (−41%) | 1952 (−40%) | 1651 (−48%) |
| ELONGATION, % | 469 | 513 | 512 |
| DUROMETER, SHORE A | 69 | 69 | 68 |
| M50 | 173 (−49%) | 173 (−43%) | 170 (−41%) |
| M100 | 174 (−64%) | 173 (−59%) | 170 (−57%) |
| Degraded @200 F. for 3 days | | | |
| TENSILE, Mpa/psi | 454 (−84%) | 625 (−81%) | 1016 (−68%) |
| ELONGATION, % | 469 | 507 | 549 |
| DUROMETER, SHORE A | 59 | 61 | 60 |
| M50 | 95 (−72%) | 112 (−63%) | 129 (−55%) |
| M100 | 93 (−81%) | 106 (−75%) | 126 (−68%) |
| Degraded @200 F. for 5 days | | | |
| TENSILE, Mpa/psi | Not Measurable | Not Measurable | 671 (−79) |
| ELONGATION, % | | | 545 |
| DUROMETER, SHORE A | | | 60 |
| M50 | | | 117 (−59%) |
| M100 | | | 115 (−71%) |
| Degraded @200 F. for 7 days | | | |
| TENSILE, Mpa/psi | | | Not Measurable |
| ELONGATION, % | | | |
| DUROMETER, SHORE A | | | |
| M50 | | | |
| M100 | | | |

As shown above in Table 2, physical properties of Samples A-C (for the compositions detailed in Table 1) were initially measured at room temperature. Each of Samples A-C exhibited sufficient tensile strength, elongation, and durometer necessary for downhole use (e.g., fracking).

As further shown in Table 2, Samples A-C were soaked in fresh water at 200° F. for predetermined time periods to further observe degradative properties of these compositions. After 1 day soaked in the 200° F. fresh water, each of Samples A-C lost about 40% of its tensile strength. Hardness also dropped significantly. Even though tensile strength and hardness lost was observed, each of Samples A-C still exhibited sufficient strength and hardness to withstand pressure exhibited during fracking.

After 3 days of being soaked in 200° F. fresh water, Samples A and B lost significant strength and could not withstand pressure exhibited during fracking.

After 5 days of being soaked in 200° F. fresh water, Sample A and B had completely disintegrated. However, Sample C was still intact, and the presence of the Millstab in Sample C presumably allowed this composition to withstand hydrolytic degradation longer than Samples A and C.

After about 7 days of being soaked in 200° F. fresh water, Sample C exhibited little strength and had begun to disintegrate.

Carbon Black Peroxide Cured Recipe:

The samples shown in Table 3 below were prepared according to the protocol discussed above in the section entitled "Preparation of Samples" and are representative of conventional compositions. Samples E and F are identical to Sample D except the amount of polycarbodiimides. The samples in Table 3 differ from the samples in Table 1 because carbon black (N550 by Cabot) is included instead of silica (i.e., Hi-Sil 233 by PPG), Carbon black was used as a reinforcing filler, and in contrast to silica, carbon black is hydrophobic and is generally anhydrous. Overall concentrations of each component in Samples D-F are shown below in Table 3.

TABLE 3

| Ingredients | D | E | F |
|---|---|---|---|
| Millathane 66 | 100.00 | 100.00 | 100.00 |
| Polycarbodiimide | 0.0 | 1.50 | 3.00 |
| Stearic acid | 0.50 | 0.50 | 0.50 |
| Naugard 445 | 1.00 | 1.00 | 1.00 |
| N550 | 70.00 | 70.00 | 70.00 |
| TAIC 72% | 5.00 | 5.00 | 5.00 |
| DBPH-50 | 4.00 | 4.00 | 4.00 |
| total | 180.50 | 182.00 | 183.50 |

TABLE 4

|  | D | E | F |
|---|---|---|---|
| PHYSICAL PROPERTIES | | | |
| TENSILE, psi | 3671 | 3480 | 3372 |
| ELONGATION, % | 196 | 209 | 212 |
| DUROMETER, SHORE A | 80 | 79 | 79 |
| M50, psi | 623 | 489 | 513 |
| M100, psi | 1761 | 1301 | 1288 |
| Degraded @ 200 F. for 1 day | | | |
| TENSILE, Mpa/psi | 2781 (−24%) | 3135 (−10%) | 3096 (−8%) |
| ELONGATION, % | 195 | 228 | 232 |
| DUROMETER, SHORE A | 73 | 73 | 73 |
| M50 | 397 (−36%) | 360 (−26%) | 393 (−23%) |
| M100 | 1154 (−35%) | 962 (−26%) | 1029 (−20%) |
| Degraded @200 F. for 3 days | | | |
| TENSILE, Mpa/psi | 1254 (−66%) | 2537 (−27%) | 2053 (−39%) |
| ELONGATION, % | 120 | 210 | 172 |
| DUROMETER, SHORE A | 64 | 71 | 72 |

TABLE 4-continued

|  | D | E | F |
|---|---|---|---|
| M50 | 197 (−68%) | 319 (−35%) | 347 (−32%) |
| M100 | 532 (−70%) | 841 (−35%) | 887 (−31%) |
| Degraded @200 F. for 5 days | | | |
| TENSILE, Mpa/psi | Not Measurable | 1630 (−53%) | 2278 (−32%) |
| ELONGATION, % | | 234 | 218 |
| DUROMETER, SHORE A | | 70 | 75 |
| M50 | | 210 (−57%) | 308 (−40%) |
| M100 | | 514 (−60%) | 769 (−40%) |
| Degraded @200 F. for 7 days | | | |
| TENSILE, Mpa/psi | | 701 (−80%) | 1854 (−45%) |
| ELONGATION, % | | 238 | 216 |
| DUROMETER, SHORE A | | 60 | 73 |
| M50 | | 103 (−79%) | 258 (−50%) |
| M100 | | 247 (−81%) | 636 (−51%) |

As shown in Table 4, the physical properties of Samples D-F from Table 3 were initially measured at room temperature. Each of Samples D-F exhibited sufficient tensile strength, elongation, and durometer necessary for downhole use (e.g., fracking).

As further shown in Table 4, Samples D-F of Table 3 were subsequently soaked in fresh water at 200° F. for predetermined time periods (i.e., measured after 1 day, 3 days, 5 days, and 7 days respectively) to further observe degradative properties of these compositions. From the data shown in Table 4, it is clear that carbon black filled polyurethane degrades significantly slower than the silica containing polyurethane compositions of Tables 1 and 2. This can be attributed to the hydrophobic nature of the carbon black.

It is also surprising that the polycarbodiimide has a very strong effect to the carbon black recipe. The effect was so strong that sample F only lost half the strength even after 7 days at 200° F. Such compound is very advantageous in very hot environment, perhaps at or beyond 250° F., to maintain holding power and can still degrade reasonably fast.

Silica and Carbon Black Peroxide Cured or Sulfur Cured Recipes:

Table 5 further depicts additional exemplary hydrolytically degradable samples (Samples G-I) prepared according to the protocol discussed above in the section entitled "Preparation of Samples" that include both silica and carbon black therein. More specifically, Samples G and H are peroxide cured (i.e., DBPH-50 and TAIC 72%) recipes that are substantially similar to one another. These samples only differ in amounts of silica (HiSil 233) and carbon black (N550) included therein. As specifically shown in Table 5, Sample G includes 40.0 phr silica (HiSil 233) and 0.5 phr carbon black (N550) while Sample H includes 15.0 phr silica (HiSil 233) and 32.0 phr carbon black (N550). In contrast to Samples G and H, Sample I includes a sulfur curing system (i.e., MBTS, Thanecure® ZM, Spider Sulfur®, and MBT) as well as a different millable polyurethane (Millathane 76) and varied amounts of silica (HiSil 233) and carbon black (N234). The different curing systems used for Samples G-I as well as including a combination of silica and carbon black therein demonstrates a proof of concept that peroxide and/or sulfur curing systems can be utilized for the disclosed compositions.

TABLE 5

| Ingredients | G | H | I |
|---|---|---|---|
| Millathane 66 MPU | 100 | 100.00 | NA |
| Millathane 76 MPU | NA | NA | 100.00 |
| Zinc Stearate | 0.0 | 0.0 | 0.50 |
| Stearic Acid | 2.00 | 2.00 | 0.00 |
| HiSil 233 Silica | 40.00 | 15.00 | 10.00 |
| N234 CB | 0.0 | 0.0 | 30.00 |
| N550 CB | 0.50 | 32.00 | NA |
| MBTS[2] | 0.0 | 0.0 | 4.00 |
| Thanecure ®ZM[1] | 0.0 | 0.0 | 1.00 |
| Spider Sulfur ®[3] | 0.0 | 0.0 | 1.50 |
| MBT[4] | 0.0 | 0.0 | 2.00 |
| TAIC 72% | 3.00 | 3.00 | NA |
| DBPH-50 Peroxide | 4.00 | 4.00 | NA |
| total | 149.50 | 156.00 | 149.00 |

[1]Thanecure ®ZM is manufactured by TSE Industries and includes 50% Dichloro[2,2'-dithiobis[benzothiazole]]zinc complex (CAS#: 22405-83-0) and hydrated amorphous silica (CAS#: 112926-00-08), the May 27, 2015 MSDS for this product is incorporated by reference herein.

[2]MBTS refers to 2-2'-Dithiobis(benzothiazole) (CAS#: 120-78-5), a component of the sulfur curing system disclosed herein.

[3]Spider Sulfur ® is elemental sulfur treated with magnesium carbonate (CAS#: 7704-34-9) and is manufactured by Hallstar. The Technical Data Sheet is incorporated by reference herein.

[4]MBT refers to 3-methyl-2-butene-1-thiol (or mercaptobenzothiazole) (CAS#: 149-30-4), a component of the sulfur curing system disclosed herein.

As shown in Table 6, the physical properties of Samples G-I from Table 5 were initially measured at room temperature and were then subsequently measured at various time points when subjected to various temperature(s). When initially measured, each of Samples G-I exhibited sufficient tensile strength, elongation, and durometer necessary for downhole use (e.g., fracking). Sample I initially far more tensile strength than Samples G and H, which was likely attributed to sulfur curing as opposed to being cured with peroxide(s).

As further shown in Table 6, Samples G-I of Table 5 were subsequently soaked in fresh water at 200° F. or at 175° F. for predetermined time periods (i.e., measured after 1 day, 3 days, 5 days, 9 days, and 12 days respectively) and then various properties were measured to further observe degradative properties of these compositions. From the data shown in Table 6, it is clear that each of Samples G-I remained operable for fracking and/or downhole purposes at least through 3 days when subjected to various temperatures (e.g., 175° F. or 200° F.). By the fifth day, various samples (e.g., Samples G and H) had significantly degraded at 200° F. and were no longer operable.

It should also be further noted that, even though Sample I initially exhibited far greater tensile strength and elongation (%) than Samples G and H. However, Sample I was more temperature sensitive than Samples G and H and degraded at quicker rate(s) than Samples G and H due to reversion (i.e., the polymeric composition degrading and reversing back to its monomeric state(s)) of Sample I.

TABLE 6

| | \multicolumn{5}{c}{Sample(s)} | | | | |
|---|---|---|---|---|---|
| | G | G | H | H | I |
| | Initial Ambient Properties | Initial Ambient Properties | Initial Ambient Properties | Initial Ambient Properties | Initial Ambient Properties |
| Tensile (PSI) | 2763 | 2763 | 2919 | 2919 | 4166 |
| Elongation (%) | 355 | 355 | 348 | 348 | 513 |
| M50 (PSI) | NA[1] | NA | 378 | 378 | 417 |
| M100 (PSI) | 555 | 555 | 804 | 804 | 703 |
| | After 1 day @200 F. | After 1 day @175 F. | After 1 day @200 F. | After 1 day @175 F. | After 1 day @175 F. |
| Tensile (PSI) | 1460 | 1795 | 1109 | 1897 | 2754 |
| Elongation (%) | 451 | 294 | 261 | 275 | 430 |
| M50 (PSI) | NA | NA | 192 | 268 | 266 |
| M100 (PSI) | 158 | 391 | 369 | 546 | 463 |
| | After 3 day @200 F. | After 3 day @175 F. | After 3 day @200 F. | After 3 day @175 F. | After 3 day @175 F. |
| Tensile (PSI) | 416 | 967 | 204 | 1021 | 1024 |
| Elongation (%) | 459 | 294 | 306 | 261 | 348 |
| M50 (PSI) | NA | NA | 64 | 178 | 139 |
| M100 (PSI) | 96 | 386 | 96 | 338 | 236 |
| | After 5 day @200 F. | After 5 day @175 F. | After 5 day @200 F. | After 5 day @175 F. | After 5 day @175 F. |
| Tensile (PSI) | NM[2] | 414 | NM | 437 | 152 |
| Elongation (%) | NM | 284 | NM | 264 | NA |
| M50 (PSI) | NM | NA | NM | 64 | 63 |
| M100 (PSI) | NM | 238 | NM | 104 | 83 |
| | After 9 day @200 F. | After 9 day @175 F. | After 9 day @200 F. | After 9 day @175 F. | After 9 day @175 F. |
| Tensile (PSI) | NM | 124 | NM | 146 | NM |
| Elongation (%) | NM | 290 | NM | 267 | NM |
| M50 (PSI) | NM | NA | NM | 57 | NM |
| M100 (PSI) | NM | 55 | NM | 80 | NM |
| | After 12 day @200 F. | After 12 day @175 F. | After 12 day @200 F. | After 12 day @175 F. | After 12 day @175 F. |
| Tensile (PSI) | NM | NM | NM | NM | NM |
| Elongation (%) | NM | NM | NM | Nm | NM |
| E50 (PSI) | NM | NM | NM | NM | NM |
| E100 (PSI) | NM | NM | NM | NM | NM |

[1]NA denotes not applicable.
[2]NM denotes not measurable.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A time controlled, hydrolytically degradable composition comprising:
   (a) a polyurethane;
   (b) a precipitated silica homogeneously dispersed throughout the composition that is adapted to promote degradation of the composition when the composition is contacted with water and/or an aqueous environment, the precipitated silica having a surface area ranging from 120 to 150 m²/g;
   (c) an organic acid adapted to promote degradation of the composition when the composition is contacted with water and/or an aqueous environment;
   (d) a stabilizer that stabilizes the composition before contact with water and/or an aqueous environment;
   (e) a crosslinking agent that forms crosslinks throughout the polyurethane to provide hardness, rigidity, strength, and/or elasticity to the composition; and
   (f) an optional co-agent, that when present, is adapted to aid in crosslink formation and further improve hardness, rigidity, and/or elasticity of the composition, wherein:
   the composition is adapted to degrade upon contact with water at a pH ranging from 5 to 8 and at a temperature ranging from 100° F. to 250° F.

2. The composition of claim 1, wherein the polyurethane is selected from the group consisting of a millable polyurethane, a castable polyurethane, and a thermoplastic polyurethane.

3. The composition of claim 2, wherein the polyurethane is a millable polyurethane.

4. The composition of claim 1, wherein the organic acid is selected from oleic acid, stearic acid, adipic acid, citric acid, acetic acid, or a combination thereof.

5. The composition of claim 1, wherein the stabilizer is an antioxidant.

6. The composition of claim 5, wherein the antioxidant is an aromatic amine antioxidant.

7. The composition of claim 5, wherein the aromatic antioxidant is an aromatic polycarboiimide at concentration ranging from 1 to 10 phr.

8. The composition of claim 1, wherein the stabilizer is a polycarboiimide at an overall concentration ranging from 1 to 10 phr in the composition.

9. The composition of claim 1, wherein the first cross-linking agent is a peroxide.

10. The composition of claim 9, wherein the co-agent is present and is triallyl isocyanurate.

11. The composition of claim 1, wherein the first cross-linking agent comprises thiol group(s), and/or a sulfur/sulfur donor.

12. The composition of claim 1, wherein the composition is configured to lose from 35% to 50% tensile strength after contact with water for twenty four hours at a temperature of 180° F. to 230° F.

13. The composition of claim 1, wherein the composition comprises
an initial tensile strength of 1000 to 5000 psi, elongation percentage of 100% to 1000%, and shore A durometer ranging from 60 to 95 before contact with water, and
is configured to degrade having 0 to 500 psi tensile strength, 50 to 500% elongation percentage, and 20 to 60 Shore A durometer after three days of continuous contact with water at a temperature ranging from 150° F. to 250° F.

14. The composition of claim 1, wherein the composition comprises
an initial tensile strength of 1000 to 5000 psi, elongation percentage of 0 to 200%, and shore A durometer ranging from 60 to 95 before contact with water, and
is configured to degrade having 0 to 200 psi tensile strength, 0 to 200% elongation percentage, and 10 to 40 Shore A durometer after five days of continuous contact with water at a temperature ranging from 150° F. to 250° F.

15. The composition of claim 1, wherein the composition is adapted for downhole use.

16. The composition of claim 1, wherein the composition is adapted for use in a frac plug assembly for downhole purposes.

17. A hydrolytically degradable frac plug seal adapted for downhole use in a wellbore, the frac plug seal comprised of:
(a) a millable polyurethane;
(b) precipitated silica or a combination of precipitated silica and carbon black homogeneously dispersed throughout the frack plug seal that is adapted to promote frack plug seal degradation when the frack plug seal is contacted with water and/or an aqueous environment, the precipitated silica having a surface area ranging from 120 to 150 $m^2/g$;
(c) an organic acid adapted to promote degradation of the frack plug seal when the frack plug seal is contacted with water and/or an aqueous environment;
(d) a stabilizer that stabilizes the composition before contact with water and/or an aqueous environment; and
(e) a crosslinking agent adapted that forms crosslinks throughout the millable polyurethane to provide hardness, rigidity, strength, and/or elasticity to the composition; wherein
the frack plug seal is configured to degrade in a time controlled upon contact with water and/or an aqueous environment at a temperature, ranging from 100° F. to 250° F.

18. The hydrolytically degradable frac plug seal of claim 17, wherein the precipitated silica, carbon black, or the combination thereof is homogeneously dispersed throughout the polyurethane.

* * * * *